United States Patent
Hayami

(10) Patent No.: US 11,472,404 B2
(45) Date of Patent: Oct. 18, 2022

(54) COLLISION PREDICTION DEVICE, COLLISION PREDICTION METHOD, AND PROGRAM

(71) Applicant: Murakami Corporation, Shizuoka (JP)

(72) Inventor: Atsushi Hayami, Shizuoka (JP)

(73) Assignee: MURAKAMI CORPORATION, Shizuoka (JP)

( * ) Notice: Subject to any disclaimer, the term of this patent is extended or adjusted under 35 U.S.C. 154(b) by 93 days.

(21) Appl. No.: 16/640,950

(22) PCT Filed: Aug. 22, 2018

(86) PCT No.: PCT/JP2018/030997
§ 371 (c)(1),
(2) Date: Feb. 21, 2020

(87) PCT Pub. No.: WO2019/044625
PCT Pub. Date: Mar. 7, 2019

(65) Prior Publication Data
US 2020/0207340 A1    Jul. 2, 2020

(30) Foreign Application Priority Data
Sep. 1, 2017 (JP) .............................. JP2017-168497

(51) Int. Cl.
*B60W 30/095* (2012.01)
*B60R 21/01* (2006.01)
(Continued)

(52) U.S. Cl.
CPC ......... *B60W 30/0956* (2013.01); *B60R 11/04* (2013.01); *B60R 21/01* (2013.01);
(Continued)

(58) Field of Classification Search
CPC ........... G06K 9/00805; G06K 9/00825; G06K 9/4661; B60W 30/0956; B60W 2554/802;
(Continued)

(56) References Cited

U.S. PATENT DOCUMENTS 9,824,586 B2    11/2017  Sato et al.
10,220,842 B2    3/2019  Moritani et al.
(Continued)

FOREIGN PATENT DOCUMENTS

CN    101391589    3/2009
CN    107082062    8/2017
(Continued)

OTHER PUBLICATIONS

Official Communication issued in International Bureau of WIPO Patent Application No. PCT/JP2018/030997, dated Nov. 27, 2018.
(Continued)

*Primary Examiner* — Peter D Nolan
*Assistant Examiner* — Demetra R Smith-Stewart
(74) *Attorney, Agent, or Firm* — Greenblum & Bernstein, P.L.C.

(57) ABSTRACT

To shorten a time required to predict collision with other vehicles, a collision prediction device includes: a detection unit configured to detect each of a front, a rear, and a side of other vehicles located around a vehicle from a captured image of one frame in which surroundings of the vehicle are imaged; and a determination unit configured to determine a likelihood of collision with the other vehicles based on a detection result of the detection unit. The determination unit determines that the likelihood of collision with the other vehicle of which only the front or only the rear is detected is high in the other vehicles of which one or more of the front, the rear, and the side are detected by the detection unit.

6 Claims, 5 Drawing Sheets

(51) Int. Cl.
  *B60R 11/04* (2006.01)
  *G08G 1/16* (2006.01)
  *G06K 9/00* (2022.01)
  *G06K 9/46* (2006.01)
  *G06V 10/60* (2022.01)
  *G06V 20/58* (2022.01)

(52) U.S. Cl.
  CPC .............. *G06V 10/60* (2022.01); *G06V 20/58* (2022.01); *G06V 20/584* (2022.01); *G08G 1/166* (2013.01); *B60R 2021/01013* (2013.01); *B60W 2554/802* (2020.02)

(58) Field of Classification Search
  CPC .................... B60R 11/04; B60R 21/01; B60R 2021/01013; G08G 1/166
  See application file for complete search history.

(56) References Cited

U.S. PATENT DOCUMENTS

| | | | | |
|---|---|---|---|---|
| 10,442,343 | B2* | 10/2019 | Ogawa | .................... H05B 45/10 |
| 2003/0007074 | A1* | 1/2003 | Nagaoka | .................. H04N 7/18 |
| | | | | 348/148 |
| 2008/0180528 | A1* | 7/2008 | Saito | .................. G06K 9/00825 |
| | | | | 348/148 |
| 2008/0181461 | A1* | 7/2008 | Saito | .................. G06K 9/00825 |
| | | | | 382/104 |
| 2008/0309517 | A1* | 12/2008 | Saito | ......................... B60R 1/00 |
| | | | | 340/937 |
| 2014/0037138 | A1 | 2/2014 | Sato et al. | |
| 2014/0300743 | A1* | 10/2014 | Kumon | ................... G06T 11/00 |
| | | | | 348/148 |
| 2015/0153735 | A1* | 6/2015 | Clarke | ................. B62D 15/025 |
| | | | | 701/301 |
| 2015/0262375 | A1* | 9/2015 | Inomata | ................. G06V 20/58 |
| | | | | 382/107 |
| 2015/0269449 | A1* | 9/2015 | Kosaki | ................... G06V 20/58 |
| | | | | 382/103 |
| 2016/0003670 | A1* | 1/2016 | Li | ......................... G01J 1/0228 |
| | | | | 356/218 |
| 2016/0362080 | A1* | 12/2016 | Kim | .................... B60R 21/0134 |
| 2017/0008521 | A1* | 1/2017 | Braunstein | ............ B60W 40/06 |
| 2018/0009374 | A1* | 1/2018 | Kim | ....................... B60Q 1/085 |
| 2018/0118204 | A1* | 5/2018 | Ito | ...................... B60K 31/0008 |

FOREIGN PATENT DOCUMENTS

| | | |
|---|---|---|
| JP | 2011-48420 A | 3/2011 |
| JP | 2013-80286 A | 5/2013 |
| JP | 2014-29604 A | 2/2014 |
| JP | 2014-182632 A | 9/2014 |
| JP | 2016-142647 A | 8/2016 |

OTHER PUBLICATIONS

China Office Action received in CN Application No. 201880056201.X, dated Jul. 30, 2021 and English language translation thereof.

* cited by examiner

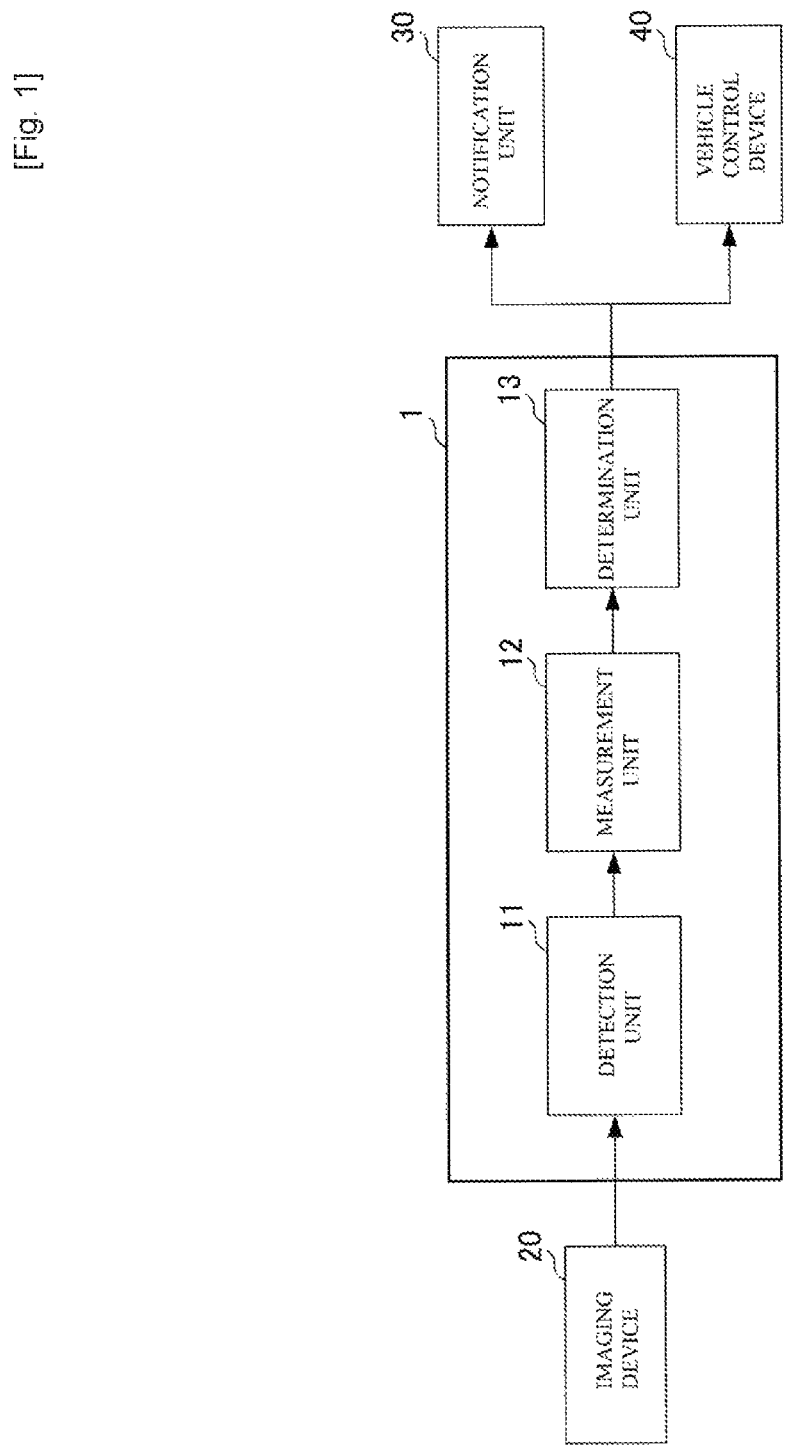
[Fig. 1]

[Fig. 2]
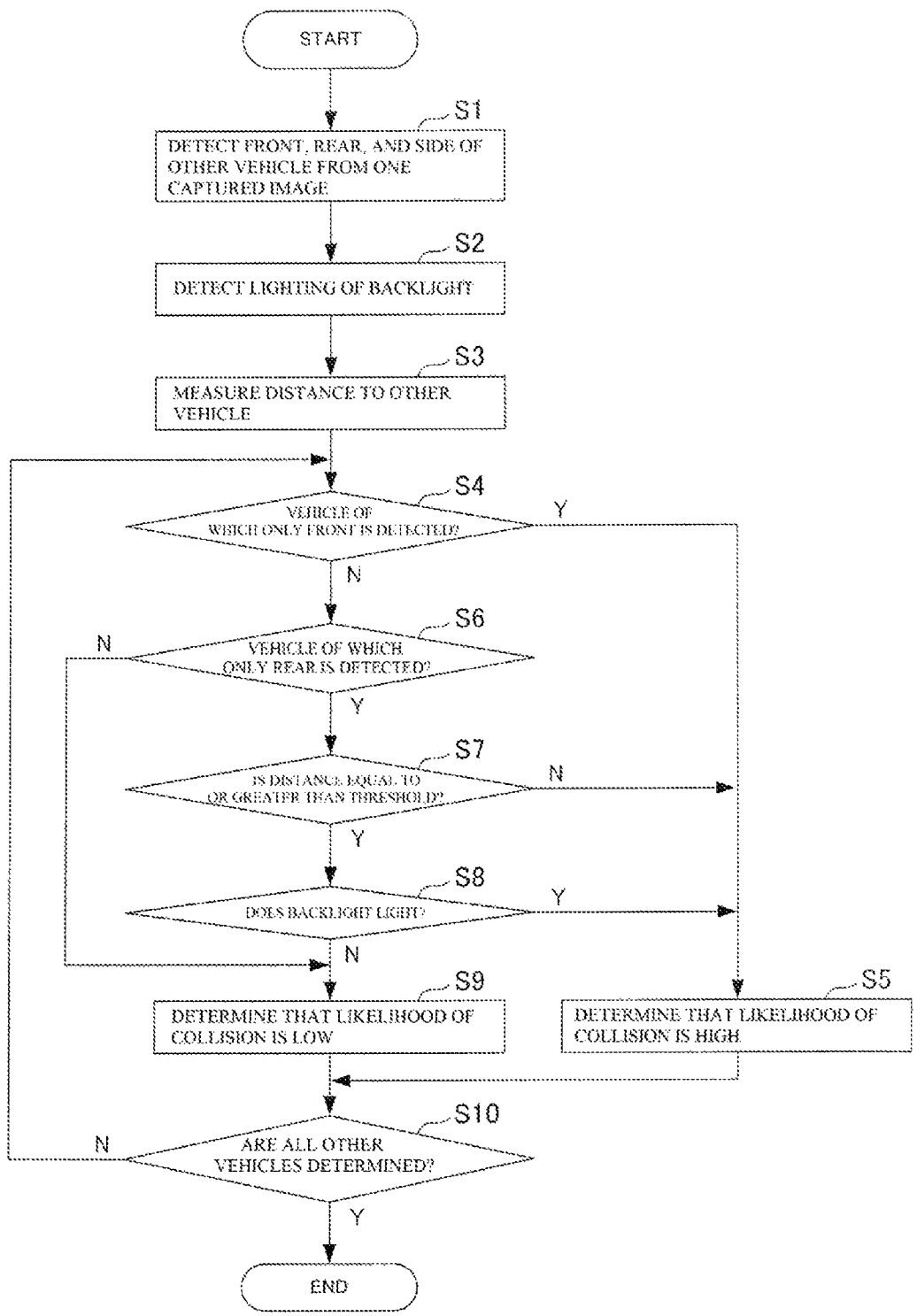

[Fig. 3]
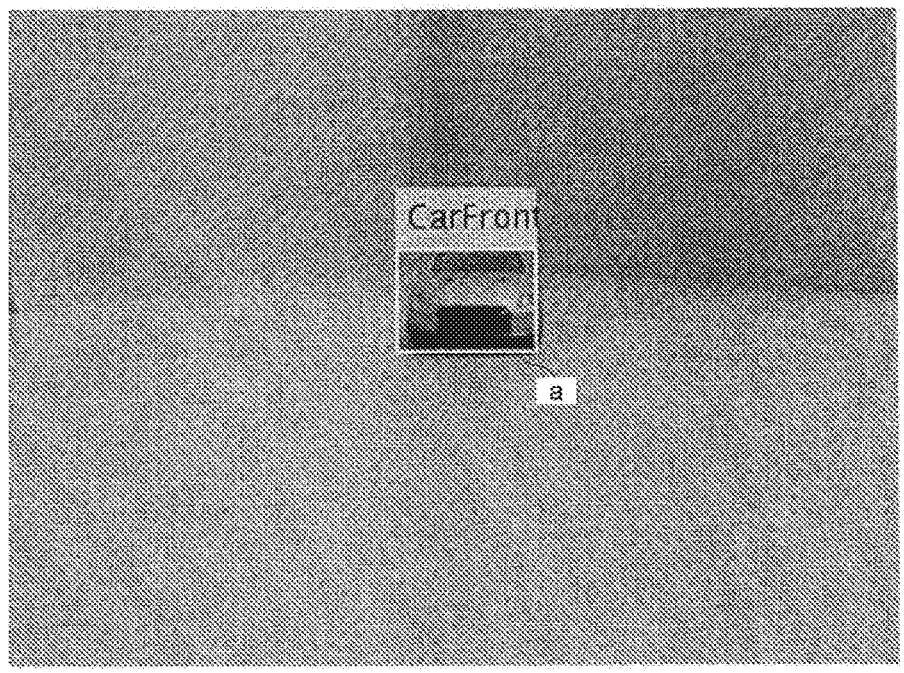
[Fig. 4]
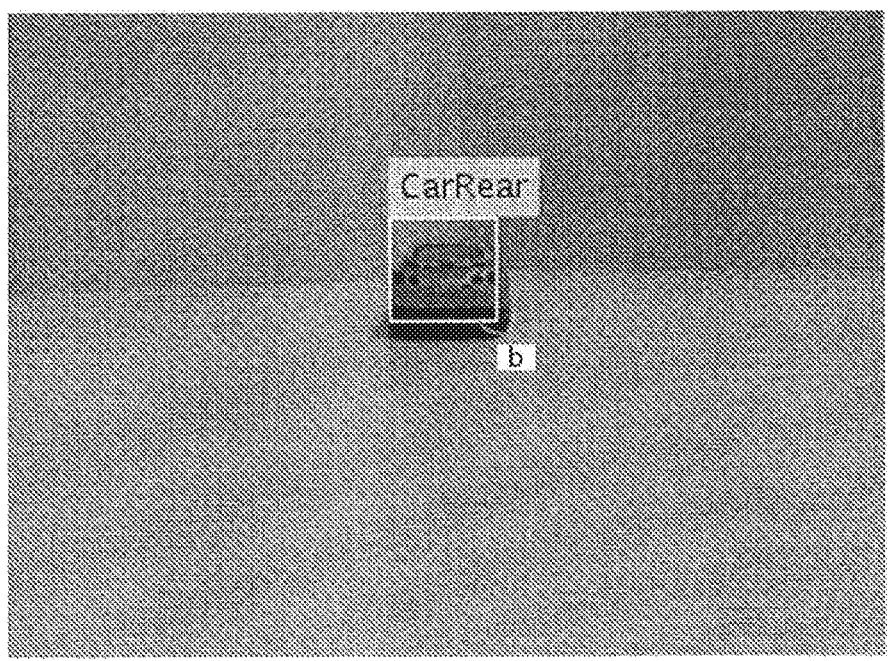

[Fig. 5]
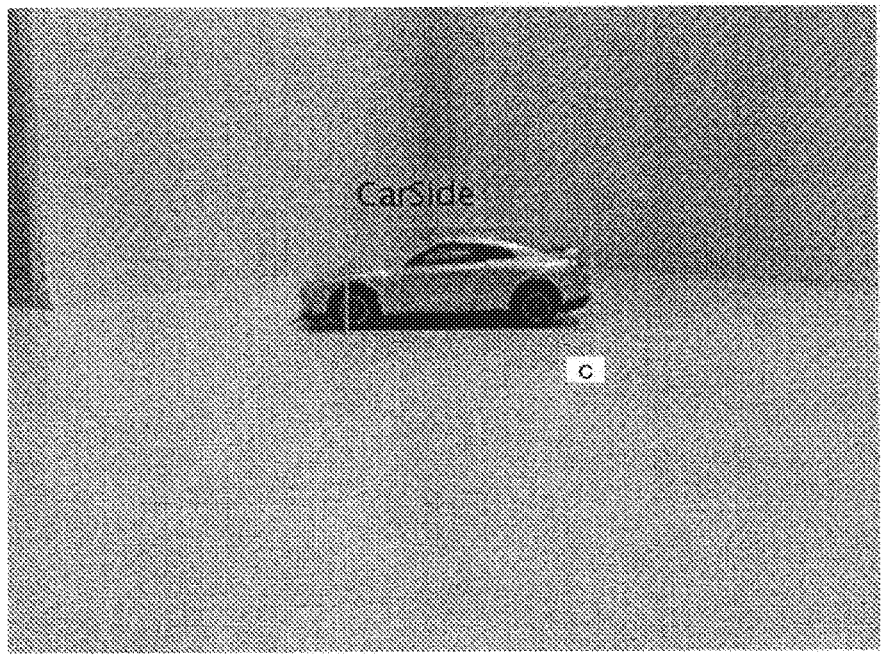
[Fig. 6]
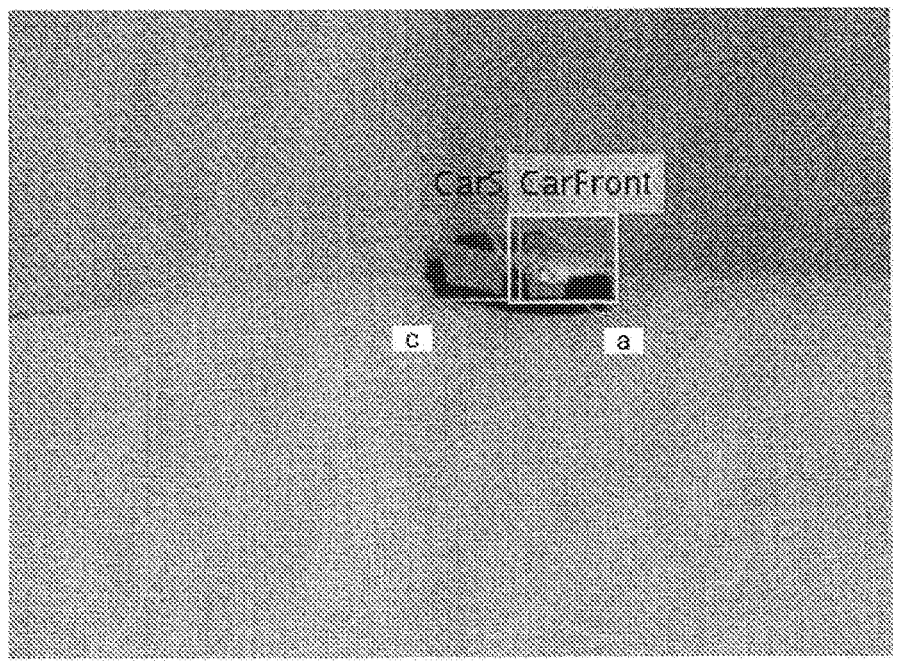

[Fig. 7]
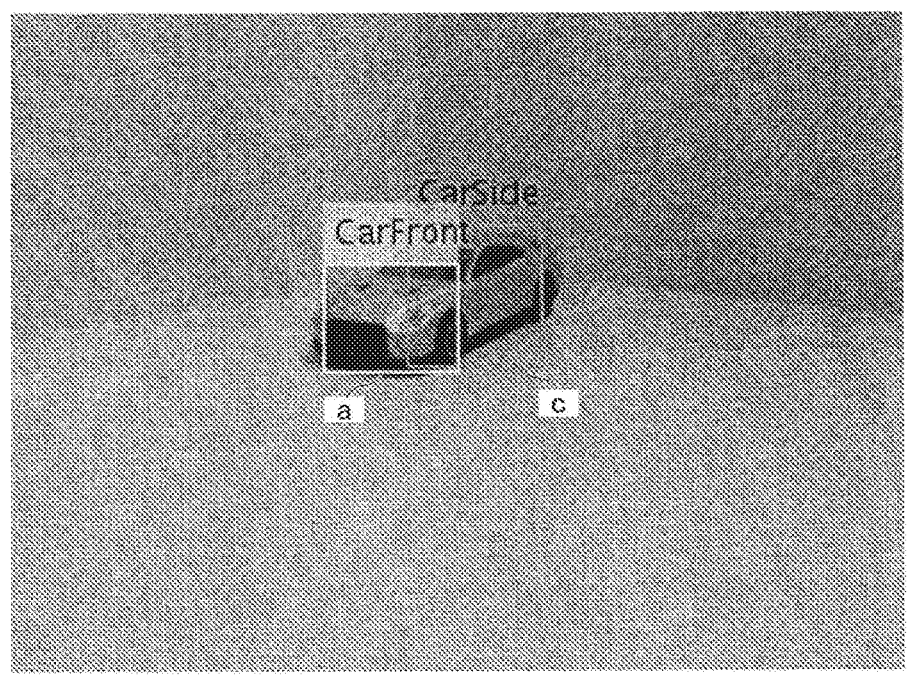

COLLISION PREDICTION DEVICE, COLLISION PREDICTION METHOD, AND PROGRAM

TECHNICAL FIELD

The present invention relates to a collision prediction device, a collision prediction method, and a program.

BACKGROUND ART

In the related art, systems detecting other vehicles located around vehicles using a millimeter wave radar or an imaging device mounted on vehicles and supporting avoidance of collision with detected vehicles have been developed. The systems are called pre-crash safety (PCS) systems, and the systems can achieve avoidance of the collision by issuing a warning, automatically operating a brake or the like when it is predicted that a likelihood of collision with a detected vehicle is high.

As a collision prediction method, a method of detecting other vehicles of which an orientation is inclined from an optical flow of captured images of two frames of which imaging times are different, estimating travel trajectories of the other vehicles, and predicting collision has been proposed (for example, see Patent Literature 1).

CITATION LIST

Patent Literature

[Patent Literature 1]
Japanese Unexamined Patent Application Publication No. 2011-48420

SUMMARY OF INVENTION

Technical Problem

However, in the prediction method of the related art, captured images of two frames of which imaging times are shifted are necessary for prediction of collision. Since it takes time to obtain the captured images, prediction of collision may be late when a vehicle is traveling at a high speed.

An objective of the present invention is to shorten a time required to predict collision with other vehicles.

Solution to Problem

According to the invention according to claim 1, there is provided a collision prediction device including:

a detection unit configured to detect each of a front, a rear, and a side of other vehicles located around a vehicle from a captured image of one frame in which surroundings of the vehicle are imaged; and a determination unit configured to determine a likelihood of collision with the other vehicles based on a detection result of the detection unit, wherein the determination unit determines that the likelihood of collision with the other vehicle of which only the front or only the rear is detected is high among the other vehicles of which one or more of the front, the rear, and the side are detected by the detection unit.

Thus, the other vehicle with which the likelihood of collision is high can be determined from a captured image of one frame. Captured images of a plurality of frames are not necessary for collision prediction and it is possible to shorten a time until start of the prediction and further a time required for prediction of collision. Since another vehicle of which only the front is detected from a captured image, for example, another vehicle traveling toward the vehicle and another vehicle of which only the rear is detected, for example, another vehicle located in a travel direction of the vehicle, can be set as a collision avoiding target, appropriate collision avoiding support can be realized.

According to the invention according to claim 2, the collision prediction device according to claim 1, further including:

a measurement unit configured to measure a distance between the vehicle and the other vehicle from the captured image of one frame, wherein the determination unit determines that a likelihood of collision with the other vehicle of which only the front or only the rear is detected by the detection unit and of which the distance measured by the measurement unit is less than a threshold is high.

Thus, the other vehicle with which an inter-vehicle distance is not sufficient can be set as a collision avoiding target.

According to the invention according to claim 3, in the collision prediction device according to claim 1 or 2, wherein the detection unit detects lighting of a backlight of the other vehicle of which only the rear is detected in the captured image of one frame, and wherein the determination unit determines that a likelihood of collision with the other vehicle of which only the rear is detected by the detection unit and of which the lighting of the backlight is detected is high.

Thus, the other vehicle traveling in reverse toward the vehicle can be set as a collision avoiding target.

According to the invention according to claim 4, there is provided a collision prediction method including:

a step of detecting each of a front, a rear, and a side of other vehicles located around a vehicle from a captured image of one frame in which surroundings of the vehicle are imaged; and a step of determining a likelihood of collision with the other vehicles based on a detection result, wherein, in the determining step, it is determined that the likelihood of collision with the other vehicle of which only the front or only the rear is detected is high among the other vehicles of which one or more of the front, the rear, and the side are detected in the detecting step.

Thus, the other vehicle with Which the likelihood of collision is high can be determined from a captured image of one frame. Captured images of a plurality of frames are not necessary for collision prediction and it is possible to shorten a time until start of the prediction and further a time required for prediction of collision. Since another vehicle of Which only the front is detected from a captured image, for example, another vehicle traveling toward the vehicle and another vehicle of which only the rear is detected, for example, another vehicle located in a travel direction of the vehicle, can be set as a collision avoiding target, appropriate collision avoiding support can be realized.

According to the invention according to claim 5, there is provided a program for causing a computer to execute a collision prediction method, the collision prediction method including:

a step of detecting each of a front, a rear, and a side of other vehicles located around a vehicle from a captured image of one frame in which surroundings of the vehicle are imaged; and a step of determining a likelihood of collision with the other vehicles based on the detection result, wherein, in the determining step, it is determined that the likelihood of collision with the other vehicle of which only the front or only the rear is detected is high among the other vehicles of which one or more of the front, the rear, and the side are detected in the detecting step.

Thus, the other vehicle with which the likelihood of collision is high can be determined from a captured image of one frame. Captured images of a plurality of frames are not necessary for collision prediction and it is possible to shorten a time until start of the prediction and further a time required for prediction of collision. Since another vehicle of which only the front is detected from a captured image, for example, another vehicle traveling toward the vehicle and another vehicle of which only the rear is detected, for example, another vehicle located in a travel direction of the vehicle, can be set as a collision avoiding target, appropriate collision avoiding support can be realized.

Advantageous Effects of Invention

According to the present invention, it is possible to shorten a time required to predict collision with other vehicles.

BRIEF DESCRIPTION OF DRAWINGS

FIG. 1 is a block diagram illustrating a main functional configuration of a collision prediction device according to an embodiment of the present invention.

FIG. 2 is a flowchart illustrating a processing procedure when a likelihood of collision with other vehicles is determined in the collision prediction device.

FIG. 3 is a diagram illustrating a captured image of another vehicle of which only the front is detected.

FIG. 4 is a diagram illustrating a captured image of another vehicle of which only the rear is detected.

FIG. 5 is a diagram illustrating a captured image of another vehicle of which only the side is detected.

FIG. 6 is a diagram illustrating a captured image of another vehicle of which the front and the side are each detected.

FIG. 7 is a diagram illustrating a captured image of another vehicle of which the front and the side are each detected.

DESCRIPTION OF EMBODIMENTS

Hereinafter, embodiments of a collision prediction device, a collision prediction method, and a program according to the present invention will be described with reference to the drawings.

FIG. 1 is a block diagram illustrating a main functional configuration of a collision prediction device 1 according to an embodiment of the present invention.

As illustrated in FIG. 1, the collision prediction device 1 is connected to an imaging device 20, a notification unit 30, and a vehicle control device 40 mounted on the same vehicle as that of the collision prediction device 1.

The collision prediction device 1 predicts collision with other vehicles located around the vehicle from captured images generated by the imaging device 20. The collision prediction device 1 outputs a collision prediction result to the notification unit 30 and the vehicle control device 40.

Hereinafter, a vehicle to be predicted a likelihood of collision with other vehicles by the collision prediction device 1 is referred to as a target vehicle.

The imaging device 20 images the periphery of a target vehicle at constant time intervals to generate a captured image of one frame at the time of each imaging.

One imaging device 20 or a plurality of imaging devices 20 may be used to obtain captured images in directions of frontward, rearward, and sideward from the target vehicle or one imaging device 20 may be rotated to obtain captured images in all of these directions. As an imaging range for the imaging device 20 is made larger, a detection range of other vehicles with which collision can be predicted can be broadened.

The notification unit 30 notifies a driver of the presence of other vehicles with which a likelihood of collision predicted by the collision prediction device 1 is high. A notification method is not particularly limited and the presence of other vehicles can be notified by sound, voice, display, vibration, or the like. A speaker, a display, a vibrator, or the like can be used as the notification unit 30.

The vehicle control device 40 controls an operation of a brake, an accelerator, a steering wheel, or the like of the target vehicle. When the collision prediction device 1 predicts that there is a high likelihood of collision with the other vehicle, the vehicle control device 40 can automatically control departure, stop, a travel speed, a travel direction, and the like of the target vehicle to support avoidance of the collision.

(Collision Prediction Device)

As illustrated in FIG. 1, the collision prediction device 1 includes a detection unit 11, a measurement unit 12, and a determination unit 13. Processing content of each of the detection unit 11, the measurement unit 12, and the determination unit 13 can be realized by software processing in which a computer reads a program that describes a processing procedure of each unit from a storage medium storing the program therein and execute the program. For example, a processor such as a central processing unit (CPU) or a graphics processing unit (GPU) can be used as the computer. A hard disk, a read-only memory (ROM), or the like can be used as the storage medium.

The detection unit 11 inputs a captured image generated at constant time intervals by the imaging device 20. Whenever a captured image of one frame is input, the detection unit 11 detects each of the front, the rear, and the side of the other vehicle located around the target vehicle from the captured image of one frame.

The detection unit 11 can also detect lighting of a backlight of the other vehicle of Which only the rear is detected in the captured image of one frame. The backlight is a light that is provided on the rear of the vehicle and is lit only when the vehicle travels in reverse.

The measurement unit 12 measures a distance between the target vehicle and the other detected vehicle from the captured image of one frame in which the front, the rear, and the side of the other vehicle are detected by the detection unit 11.

The determination unit 13 determines a likelihood of collision with other vehicles based on a detection result of the detection unit 11.

FIG. 2 illustrates a processing procedure when a likelihood of collision is predicted in the collision prediction device 1. The collision prediction device 1 performs the processing procedure whenever a captured image of one frame is input from the imaging device 20.

As illustrated in FIG. 2, in the collision prediction device 1, the detection unit 11 detects each of the front, the rear, and the side of the other vehicle located around the target vehicle within the imaging range from the captured image of one frame input from the imaging device 20 (step S1).

A detection method by the detection unit 11 is not particularly limited, for example, machine learning, deep learning in which artificial intelligence is used, or the like can be used. As the machine learning, for example, a neural network, a support vector machine, or the like can be exemplified. As the deep learning, for example, Faster-RCNN or the like can be exemplified. Of these methods, deep learning such as Faster-RCNN is preferable in that detection accuracy is high and a process speed is high. In the case of machine learning or deep learning, the detection unit 11 learns features of images of the fronts, the rears, and the sides of vehicles using captured images obtained by imaging other vehicles of different models at different distance or from different directions as learning images. Then, the detection unit 11 detects image regions matching the learned features of the images of the fronts, the rears, the sides of the vehicles in detection target captured images.

FIG. 3 is a diagram illustrating an example of a captured image of another vehicle of which only the front is detected. A frame a in FIG. 3 shows an image region of the front of the detected other vehicle.

When the other vehicle faces the front, the rear, or the side of the target vehicle, as illustrated in FIG. 3, only the front of the other vehicle is detected. For example, when only the front of the other vehicle is detected from a captured image obtained by imaging the front of the target vehicle, as illustrated in FIG. 3, a scenario in which the target vehicle and the other vehicle face each other, or the like can be assumed. In the case of a captured image obtained by imaging the rear or the side of the target vehicle, a scenario in which the other vehicle is traveling toward the target vehicle or the like can be assumed.

FIG. 4 illustrates an example of a captured image in which only the rear of the other vehicle is detected. A frame b in FIG. 4 shows an image region of the rear of the detected other vehicle.

When the target vehicle is traveling toward the other vehicle, as illustrated in FIG. 4, only the rear of the other vehicle is detected. For example. When only the rear of the other vehicle is detected from a captured image obtained by imaging the front of the target vehicle, as illustrated in FIG. 4, a scenario in which the target vehicle is traveling toward the other vehicle or the like can be assumed. In the case of a captured image obtained by imaging the rear or the side of the target vehicle, a scenario in which the other vehicle moves away from the target vehicle or the other vehicle is traveling in reverse toward the target vehicle or the like can be assumed.

FIG. 5 illustrates an example of a captured image in which only the side of the other vehicle is detected. A frame c in FIG. 5 shows an image region of the other vehicle of which only the side is detected.

When another vehicle is crossing in front of or to the rear of the target vehicle or is traveling along a lane next to the target vehicle, as illustrated in FIG. 5, only the side of the other vehicle is detected. For example, when only the side of the other vehicle is detected from a captured image obtained by imaging the front or the rear of the target vehicle, as illustrated in FIG. 5, a scenario in which the other vehicle is crossing can be assumed. In the case of a captured image obtained by imaging the side of the target vehicle, a scenario in which the other vehicle is traveling along a lane next to the target vehicle can be assumed.

FIGS. 6 and 7 illustrate examples of captured images in which the front and the side of the other vehicle are each detected. In FIGS. 6 and 7, on one other vehicle, both of the frame a indicating detection of an image region of the front and the frame c indicating detection of an image region of the side overlap.

When an orientation of the other vehicle is inclined with respect to the target vehicle, as illustrated in FIGS. 6 and 7, both of the front and the side of the other vehicle are detected.

Subsequently, the detection unit 11 further detects lighting of the backlight of the other vehicle of which only the rear is detected in the captured image of one frame (step S2).

The lighting of the backlight can also be detected by using an image of the vehicle of which the backlight is lit as a learning image by the above-described machine learning or deep learning. Since luminance increases during lighting, a position of the backlight is detected by template matching or the like, the captured image is then binarized, and when an image region of the detected backlight is white and has low density, it can be determined that the backlight is lit.

When the detection ends, the measurement unit 12 measures a distance between the target vehicle and the other vehicle from the captured image of one frame in which the other vehicle is detected (step S3).

A measurement method for an inter-vehicle distance is not particularly limited. For example, the measurement unit 12 sets xy coordinates on a captured image in which a travel direction of the target vehicle is the y direction and a direction perpendicular to the travel direction is the x direction. Then, the measurement unit 12 obtains coordinates of a vanishing point on the captured image. A method of obtaining the coordinates of the vanishing point is not particularly limited, for example, the coordinates can be specified based on a straight line such as a white line included in the captured image. The measurement unit 12 sets a length from a lower side of the captured image to the vanishing point to y0 in the y direction, obtains a basic angle of an isosceles triangle that has the vanishing point as a vertex and the lower side of the captured image as a base, and obtains a length y1 from the lower side of the captured image to a bottom of the vehicle in they direction. A length x0 of the lower side of the captured image in the x direction is uniquely determined when a distance from the imaging device 20 to the ground is fixed. The measurement unit 12 estimates a distance from the target vehicle to the other vehicle using the obtained lengths y0 and y1 by perspective.

After the measurement, the determination unit 13 determines a likelihood of collision with the other vehicle detected from the captured image. When a plurality of other vehicles are detected, the determination unit 13 extracts one of the vehicles. When the extracted other vehicle is the other vehicle of which only the front is detected among the front, the rear, and the side (Y in step S4), the determination unit 13 determines that the likelihood of collision with the extracted other vehicle is high (step S5). Thus, of the other vehicles of which one or more of the front, the rear, and the side are detected from the captured images, the other vehicle of which only the front is detected, for example, the other vehicle traveling toward the target vehicle can be set as a collision avoidance target.

When the extracted other vehicle is the other vehicle of which only the rear is detected (N in step S4, Y in step S6), the determination unit 13 compares a distance to the other vehicle measured by the measurement unit 12 with a threshold. The threshold can be arbitrarily determined in accordance with a sufficient distance for collision avoidance. For example, when a sufficient distance for collision avoidance is 100 m, the threshold can be set to 100 m. Since whether the collision avoidance is sufficient also changes in accordance with a travel speed, the threshold may not be a constant value, and may be a value that varies in accordance with a travel speed of the target vehicle. When a travel speed of the target vehicle with respect to the other vehicle is high, an inter-vehicle distance decreases in a short time, thus, when a travel speed of the other vehicle is ascertained, the threshold may vary in accordance with a relative speed of the target vehicle to the other vehicle.

When the distance between the target vehicle and the other vehicle of which only the rear is detected is less than the threshold (N in step S7), the determination unit 13 determines that the likelihood of collision with the other vehicle is high (step S5). Thus, the other vehicle of which only the rear is detected, for example, the other vehicle which is located in a travel direction of the target vehicle and with which the inter-vehicle distance is not sufficient can be set as a collision avoidance target.

When the distance between the target vehicle and the other vehicle of which only the rear is detected is equal to or greater than the threshold (Y in step S7) and lighting of the backlight of the other vehicle is detected (Y in step S8), the determination unit 13 determines that the likelihood of collision with the other vehicle is high (step S5). Thus, even when the inter-vehicle distance is sufficient at the time of detection, the other vehicle traveling in reverse toward the target vehicle can be set as a collision avoidance target.

Conversely, when the distance between the target vehicle and the other vehicle of which only the rear is detected is equal to or greater than the threshold (Y in step S7) and lighting of the backlight of the other vehicle is not detected (N in step S8), the determination unit 13 determines that the likelihood of collision with the other vehicle is low (step S9). Thus, the likelihood of collision with the other vehicle which is located in the travel direction of the target vehicle, of which the travel direction is the same, and with which the inter-vehicle distance is sufficient is determined to be low, and thus the other vehicle can be excluded from collision avoidance targets.

When the extracted other vehicle is not the other vehicle of which only the front or only the rear is detected (N in step S4, N in step S6), the determination unit 13 determines that the likelihood of collision with the other vehicle is low (step S9). Thus, for example, the other vehicle which is not traveling toward the target vehicle such as the other vehicle of which only the side is detected or the other vehicle of which both the front and the side are detected can be excluded from collision avoidance targets.

When the likelihood of collision with all the extracted other vehicles is not determined (N in step S10), the process returns to step S4 and the determination unit 13 repeats the processes of the above-described steps S4 to S9 on the undetermined other vehicles. Then, when the determination of the likelihood of collision with all the extracted other vehicles ends (Y in step S10), the process ends.

The collision prediction device 1 outputs the above-described prediction result to the notification unit 30 and the vehicle control device 40. The notification unit 30 to which the prediction result is input can notify a driver of presence of other vehicles with which a likelihood of collision is high. The vehicle control device 40 to which the prediction result is input can perform control for collision avoidance, such as an operation of a brake to automatically stop the vehicle or automatic control of an accelerator to decrease a travel speed.

As described above, the collision prediction device 1 according to the embodiment includes: the detection unit 11 that detects each of a front, a rear, and a side of other vehicles located within the imaging range around a target vehicle from a captured image of one frame in which the surroundings of the vehicle are imaged; and the determination unit 13 that determines a likelihood of collision with the other vehicles based on a detection result of the detection unit 11. In the embodiment, the determination unit 13 determines that the likelihood of collision with the other vehicles of which only the front is detected is high.

Thus, the other vehicle with which the likelihood of collision is high can be determined from a captured image of one frame. Captured images of a plurality of frames are not necessary for collision prediction and it is possible to shorten a time until start of the prediction and further a time required for prediction of collision. Even when a travel speed of the target vehicle or the other vehicle is high, a prediction result of the likelihood of collision can be output quickly and it is easy to avoid the collision. Since the other vehicle of which only the front is detected from the captured image, for example, the other vehicle traveling toward the target vehicle, can be set as a collision avoidance target, appropriate collision avoiding support can be realized.

The embodiment is a preferred example of the present invention d the present invention is not limited thereto. The embodiment can be modified appropriately in the scope of the present invention without departing from the gist of the present invention.

For example, since the target vehicle is traveling toward the other vehicle of which only the rear is detected and the likelihood of collision is high, the determination unit 13 may determine that the likelihood of collision with the other vehicle is high irrespective of a distance to the target vehicle or whether the other vehicle is traveling in reverse.

In the processing procedure, the determination unit 13 determines that the likelihood of collision with the other vehicle of which only the front is detected is high irrespective of a distance to the target vehicle, but the likelihood of collision with the other vehicle of which only the front is detected may be determined in accordance with the distance to the target vehicle. Specifically, the determination unit 13 can determine that the likelihood of collision with the other vehicle of which only the front is detected and the measured distance to the target vehicle is less than the threshold is high. Conversely, when the distance to the target vehicle is equal to or greater than the threshold despite the other vehicle of which only the front is detected, the determination unit 13 can determine that the likelihood of collision is low.

The other vehicle of which only the front is detected is traveling toward, and thus a time required for avoidance of collision with the target vehicle is different from a time required for avoidance of collision with the other vehicle of which only the rear is detected. Therefore, the threshold used to compare the distance between the target vehicle and the other vehicle of which only the front is detected may be different from the threshold used to compare the distance between the target vehicle and the other vehicle of which only the rear is detected in step S7 described above.

For the processing procedure, it is assumed that both the target vehicle and the other vehicle are traveling, but even when the target vehicle or the other vehicle has stopped, the likelihood of collision may be determined in accordance with the processing procedure. Here, when the target vehicle has stopped, a likelihood of collision with the other vehicle to which the target vehicle is traveling is low. Accordingly, even if it is determined in accordance with the processing procedure that the likelihood of collision with the other vehicle of which only the rear is detected (Y in step S6) and of which the distance to the target vehicle is less than the threshold (N in step S7) is high, the determination unit 13 may neglect the determination result. Information indicating whether the target vehicle has stopped can be acquired from the vehicle control device 40.

When the other vehicle has stopped, a likelihood of collision with the other vehicle which is traveling toward the target vehicle is low. Accordingly, when information indicating whether the other vehicle has stopped can be acquired, the determination unit 13 may neglect the determination result although it is determined that the likelihood of collision with the other vehicle of which only the front is detected is high in accordance with the processing procedure.

This application claims priority to and the benefit from Japanese Patent Application No. 2017-168497, filed Sep. 1, 2017, the contents of which are hereby incorporated by reference into the present application.

REFERENCE SIGNS LIST

1 Collision prediction device
11 Detection unit
12 Measurement unit
13 Determination unit
20 Imaging device

The invention claimed is:

1. A collision prediction device, comprising:
a detector configured to detect each of a front, a rear, and a side of other vehicles located around a vehicle from a captured image of one frame in which surroundings of the vehicle are imaged; and
a processor configured to determine a likelihood of collision with the other vehicles based on a detection result of the detector,
wherein, in providing a prediction result, the processor determines that the likelihood of collision with the other vehicle of which only the front or only the rear is detected is high among the other vehicles of which one or more of the front, the rear, and the side are detected by the detector, and
an output configured to transmit the prediction result to a notifier and/or a vehicle controller.

2. The collision prediction device according to claim 1, further comprising:
a measurer configured to measure a distance between the vehicle and the other vehicle from the captured image of one frame,
wherein the processor determines that a likelihood of collision with the other vehicle of which only the front or only the rear is detected by the detector and of which the distance measured by the measurer is less than a threshold is high.

3. The collision prediction device according to claim 1, wherein the detector detects lighting of a backlight of the other vehicle of which only the rear is detected in the captured image of one frame, and
wherein the processor determines that a likelihood of collision with the other vehicle of which only the rear is detected by the detector and of which the lighting of the backlight is detected is high.

4. A collision prediction method comprising:
a detection process of detecting each of a front, a rear, and a side of other vehicles located around a vehicle from a captured image of one frame in which surroundings of the vehicle are imaged; and
a determination process of determining a likelihood of collision with the other vehicles based on a detection result,
wherein, in providing a prediction result of the determination process, it is determined that the likelihood of collision with the other vehicle of which only the front or only the rear is detected is high among the other vehicles of which one or more of the front, the rear, and the side are detected in the detection process, and
providing an output that transmits the prediction result to a notifier and/or a vehicle controller.

5. A non-transitory computer-readable recording medium for causing a computer to execute a collision prediction method, the collision prediction method including:
a detection process of detecting each of a front, a rear, and a side of other vehicles located around a vehicle from a captured image of one frame in which surroundings of the vehicle are imaged; and
a determination process of determining a likelihood of collision with the other vehicles based on the detection result,
wherein, in providing a prediction result of the determination process, it is determined that the likelihood of collision with the other vehicle of which only the front or only the rear is detected is high among the other vehicles of which one or more of the front, the rear, and the side are detected in the detection process, and
providing an output that transmits the prediction result to a notifier and/or a vehicle controller.

6. The collision prediction device according to claim 2, wherein the detector detects lighting of a backlight of the other vehicle of which only the rear is detected in the captured image of one frame, and
wherein processor determines that a likelihood of collision with the other vehicle of which only the rear is detected by the detector and of which the lighting of the backlight is detected is high.

* * * * *

UNITED STATES PATENT AND TRADEMARK OFFICE
CERTIFICATE OF CORRECTION

| | | |
|---|---|---|
| PATENT NO. | : 11,472,404 B2 | |
| APPLICATION NO. | : 16/640950 | |
| DATED | : October 18, 2022 | |
| INVENTOR(S) | : A. Hayami | |

It is certified that error appears in the above-identified patent and that said Letters Patent is hereby corrected as shown below:

In the Claims

Column 10, Line 50 (Claim 6, Line 5), please change "wherein" to -- wherein the --.

Signed and Sealed this
Twenty-seventh Day of June, 2023

*Katherine Kelly Vidal*

Katherine Kelly Vidal
*Director of the United States Patent and Trademark Office*